United States Patent
Iguchi

(10) Patent No.: US 9,148,779 B2
(45) Date of Patent: Sep. 29, 2015

(54) DEVICE CAPABLE OF SAFELY COMMUNICATING DEVICE INFORMATION, COMMUNICATION CONTROL METHOD THEREFOR, AND STORAGE MEDIUM

(71) Applicant: CANON KABUSHIKI KAISHA, Tokyo (JP)

(72) Inventor: Junji Iguchi, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 482 days.

(21) Appl. No.: 13/710,714

(22) Filed: Dec. 11, 2012

(65) Prior Publication Data

US 2013/0166683 A1   Jun. 27, 2013

(30) Foreign Application Priority Data

Dec. 27, 2011   (JP) .................................. 2011-285962

(51) Int. Cl.
*G06F 15/16* (2006.01)
*H04W 8/24* (2009.01)
*H04W 84/18* (2009.01)

(52) U.S. Cl.
CPC .............. *H04W 8/24* (2013.01); *H04W 84/18* (2013.01)

(58) Field of Classification Search
CPC ........................ H04W 76/021; H04W 84/18
See application file for complete search history.

(56) References Cited

U.S. PATENT DOCUMENTS

| | | | |
|---|---|---|---|
| 2004/0008641 A1 | 1/2004 | Sugaya et al. | |
| 2009/0161630 A1* | 6/2009 | Tachibana | 370/331 |
| 2010/0177660 A1* | 7/2010 | Essinger et al. | 370/254 |
| 2010/0202296 A1* | 8/2010 | Suzuki et al. | 370/241 |
| 2010/0278075 A1* | 11/2010 | Ikeda | 370/254 |
| 2011/0149803 A1* | 6/2011 | McCormack et al. | 370/254 |

FOREIGN PATENT DOCUMENTS

| | | |
|---|---|---|
| JP | 2003-309572 A | 10/2003 |
| JP | 2009-171407 A | 7/2009 |

* cited by examiner

*Primary Examiner* — Jonathan Bui
(74) *Attorney, Agent, or Firm* — Rossi, Kimms & McDowell LLP

(57) ABSTRACT

A device which is capable of minimizing the use of resources in devices and safely communicating information such as settings on devices. The device is capable of communicating with another device via a wireless communication network and manages the other device. The device leaves a first wireless communication network to which the device is currently connected. Then, the device wirelessly connects to the other device so as to construct, with the other device that left the first wireless communication network after the device, a second wireless communication network, which is different from the first wireless communication network, by using a setting network ID for use in a setting change mode for changing setting values of the other device. The device sends setting data to the other device, to which the device was wirelessly connected, via the second wireless communication network.

12 Claims, 7 Drawing Sheets

DURING SETTING

DURING NORMAL OPERATION

US 9,148,779 B2

DEVICE CAPABLE OF SAFELY COMMUNICATING DEVICE INFORMATION, COMMUNICATION CONTROL METHOD THEREFOR, AND STORAGE MEDIUM

BACKGROUND OF THE INVENTION

1. Field of the Invention

The present invention relates to a device and a communication control method therefor, as well as a computer-readable storage medium storing a program for implementing the method, and in particular to a technique for controlling communications between devices connected to a wireless personal area network (also denoted as "WPAN") that carries out short-distance wireless communications.

2. Description of the Related Art

IEEE 802.15.4, which is low-cost and low-power-consumption although transmission speed is as low as 250 Kbps, is used as an exemplary communication method for use in constructing a WPAN. They are called Zigbee (registered trademark) and have potential for increased use in the future.

Conventionally, a technique that registers an ID in each device in advance so as to reduce operations for joining a network has been proposed (Japanese Laid-Open Patent Publication (Kokai) No. 2009-171407). Also, a technique that sets a network frame period available to a plurality of wireless networks and prepares a plurality of channel slots to thus realize coexistence of a plurality of networks has been proposed (Japanese Laid-Open Patent Publication (Kokai) No. 2003-309572).

However, the technique according to Japanese Laid-Open Patent Publication (Kokai) No. 2009-171407 has a problem that devices and a device capable of managing them are not configured by a topology suitable for configuring settings on the devices, setting data or the like is transmitted to other devices within a network, and hence security cannot be ensured. Further, because setting data or the like is successively transmitted to other devices within a network having a tree structure, communication traffic may increase.

Moreover, according to Japanese Laid-Open Patent Publication (Kokai) No. 2003-309572, maintenance such as setting of frame period and securing of channel slots is required so as to enable a plurality of independent networks to coexist, and hence a large amount of resources is required.

SUMMARY OF THE INVENTION

The present invention provides a device and a communication control method therefor, which are capable of minimizing the use of resources in devices and safely communicating information such as settings on the devices, as well as a computer-readable storage medium storing a program for implementing the method.

Accordingly, a first aspect of the present invention provides a device that is capable of communicating with another device via a wireless communication network and administers the other device, comprising a first holding unit configured to hold a setting network ID in a setting change mode for changing setting values of the other device, a first leaving unit for leaving a first wireless communication network to which the device is currently connected, a first connecting unit configured to wirelessly connect to the other device so as to construct, with the other device that left the first wireless communication network after the device, a second wireless communication network, which is different from the first wireless communication network, by using the setting network ID held by the first holding unit, and a setting data sending unit configured to send setting data to the other device, to which the device was wirelessly connected by the first connecting unit, via the second wireless communication network.

Accordingly, a second aspect of the present invention provides a device that is capable of connecting to an administrator device via a wireless communication network, comprising a second holding unit configured to hold a setting network ID in a setting change mode for changing setting values of the device, a second leaving unit for, in response to the administrator device leaving from a first wireless communication network, leaving the first wireless communication network to which the device is currently connected, a second connecting unit configured to wirelessly connect to the administrator device, which left the first wireless communication network, via a second wireless communication network, which is different from the first wireless communication network, by using the setting network ID held by the second holding unit, and a setting changing unit configured to change settings using setting data received from the administrator device.

Accordingly, a third aspect of the present invention provides a communication control method for a device that is capable of communicating with another device via a wireless communication network and administers the other device, comprising a first leaving step of leaving a first wireless communication network to which the device is currently connected, a first connecting step of wirelessly connecting to the other device so as to construct, with the other device that left the first wireless communication network after the device, a second wireless communication network, which is different from the first wireless communication network, by using a setting network ID for use in a setting change mode for changing setting values of the other device, and a setting data sending step of sending setting data to the other device, to which the device was wirelessly connected in the first connecting step, via the second wireless communication network.

Accordingly, a fourth aspect of the present invention provides a communication control method for a device that is capable of connecting to an administrator device via a wireless communication network, comprising a second leaving step of for, in response to the administrator device leaving from a first wireless communication network, leaving the first wireless communication network to which the device is currently connected, a second connecting step of wirelessly connecting to the administrator device, which left the first wireless communication network, via a second wireless communication network, which is different from the first wireless communication network, by using a setting network ID for use in a setting change mode for changing setting values of the device, and a setting changing step of changing settings using setting data received from the administrator device.

Accordingly, a fifth aspect of the present invention provides a non-transitory computer-readable storage medium storing a program for implementing a communication control method for a device that is capable of communicating with another device via a wireless communication network and administers the other device, the communication control method comprising a first leaving step of leaving a first wireless communication network to which the device is currently connected, a first connecting step of wirelessly connecting to the other device so as to construct, with the other device that left the first wireless communication network after the device, a second wireless communication network, which is different from the first wireless communication network, by using a setting network ID for use in a setting change mode for changing setting values of the other device, and a setting data sending step of sending setting data to the other device, to which the device was wirelessly connected in the first connecting step, via the second wireless communication network.

Accordingly, a sixth aspect of the present invention provides a non-transitory computer-readable storage medium storing a program for implementing a communication control method for a device that is capable of connecting to an administrator device via a wireless communication network, the communication control method comprising a second leaving step of for, in response to the administrator device leaving from a first wireless communication network, leaving the first wireless communication network to which the device is currently connected, a second connecting step of wirelessly connecting to the administrator device, which left the first wireless communication network, via a second wireless communication network, which is different from the first wireless communication network, by using a setting network ID for use in a setting change mode for changing setting values of the device, and a setting changing step of changing settings using setting data received from the administrator device.

According to the present invention, the use of resources in devices can be minimized, and information such as settings on the devices can be safely communicated.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
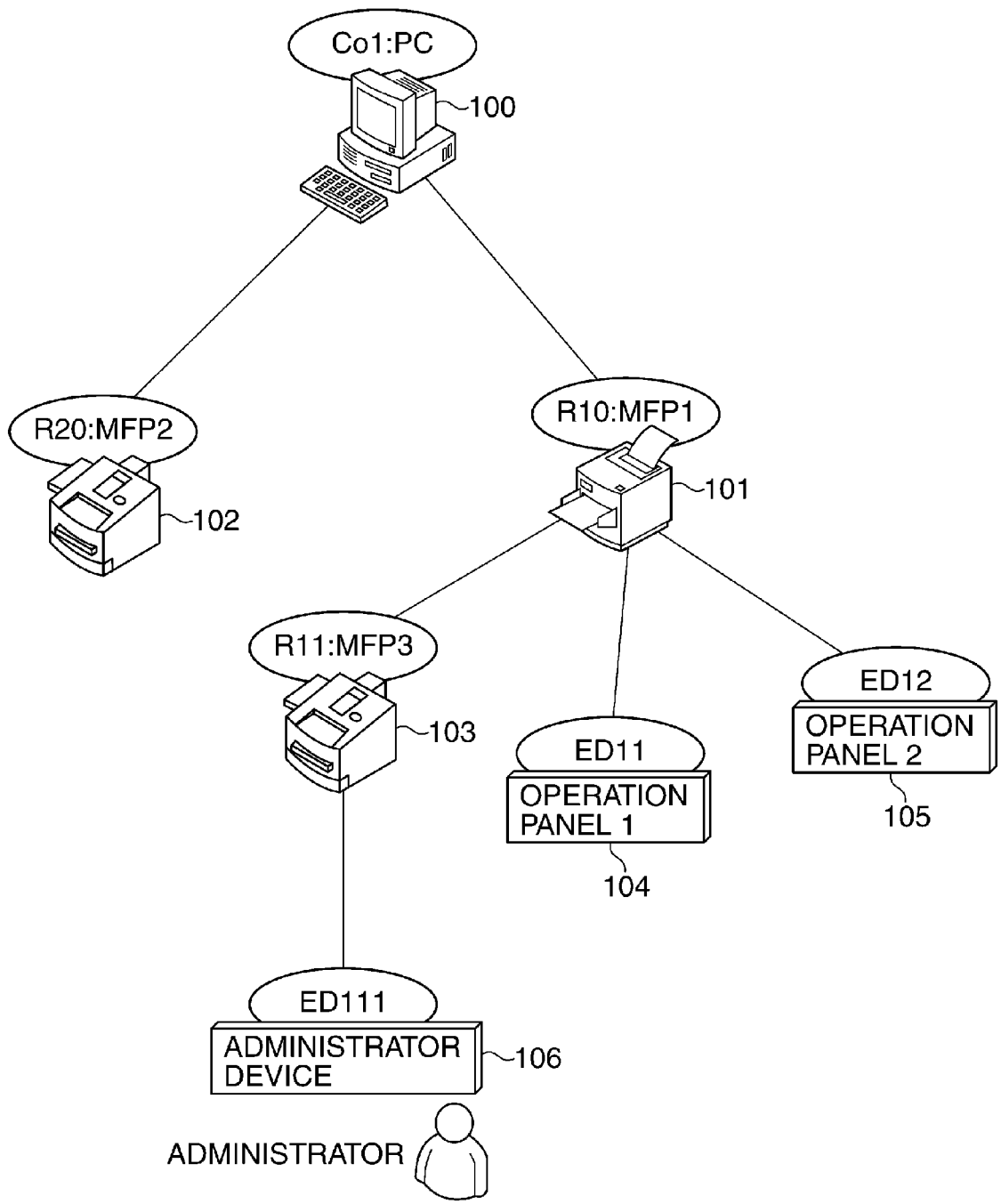
FIG. 1 is a view showing an exemplary network topology during normal operation (or standby) of a wireless communication system according to an embodiment of the present invention.

FIG. 1 is a view showing an exemplary network topology during normal operation (or standby) of a wireless communication system including devices according to an embodiment of the present invention.

The devices appearing in the figure are capable of connecting to a wireless communication network and carrying out Zigbee (registered trademark) communications. A PC (Co1) 100, which is a coordinator that manages a WPAN shown in the figure, constructs a network topology. An MFP1 (R10) 101, which is a router connected to the PC 100, is connected to an MFP3 (R11) 103 which is another router, an operation panel 1 (ED11) 104 of an end device, and an operation panel 2 (ED12) 105 of an end device. An MFP2 (R20) 102 is connected to the PC 100. It should be noted that in the present embodiment, the operation panel 1_104 and the operation panel 2_105 are capable of operating the MFP1_101, the MFP2_102, and the MFP3_103 by Zigbee (registered trademark) communication. An administrator device (ED 111) 106 is a device capable of administering the MFP3_103 and the MFP2_102 and also capable of configuring various settings.

A description will now be given of a data flow in a case where a user operates the MFP3_103 from the operation panel 1_104 as an exemplary data communication in the wireless communication system described above.

Operating information (for example, data indicative of an instruction to return from a power-saving mode) input from the operation panel 1_104 as well as an address of the MFP3_103 is sent to the MFP1_101 by Zigbee (registered trademark) communication. The MFP1_101 transfers the data, which has been received from the operation panel 1_104, to the MFP3_103. The MFP3_103 returns from the power-saving mode in accordance with the received data. In this way, data communications are carried out according to the topology.

Figure 2:
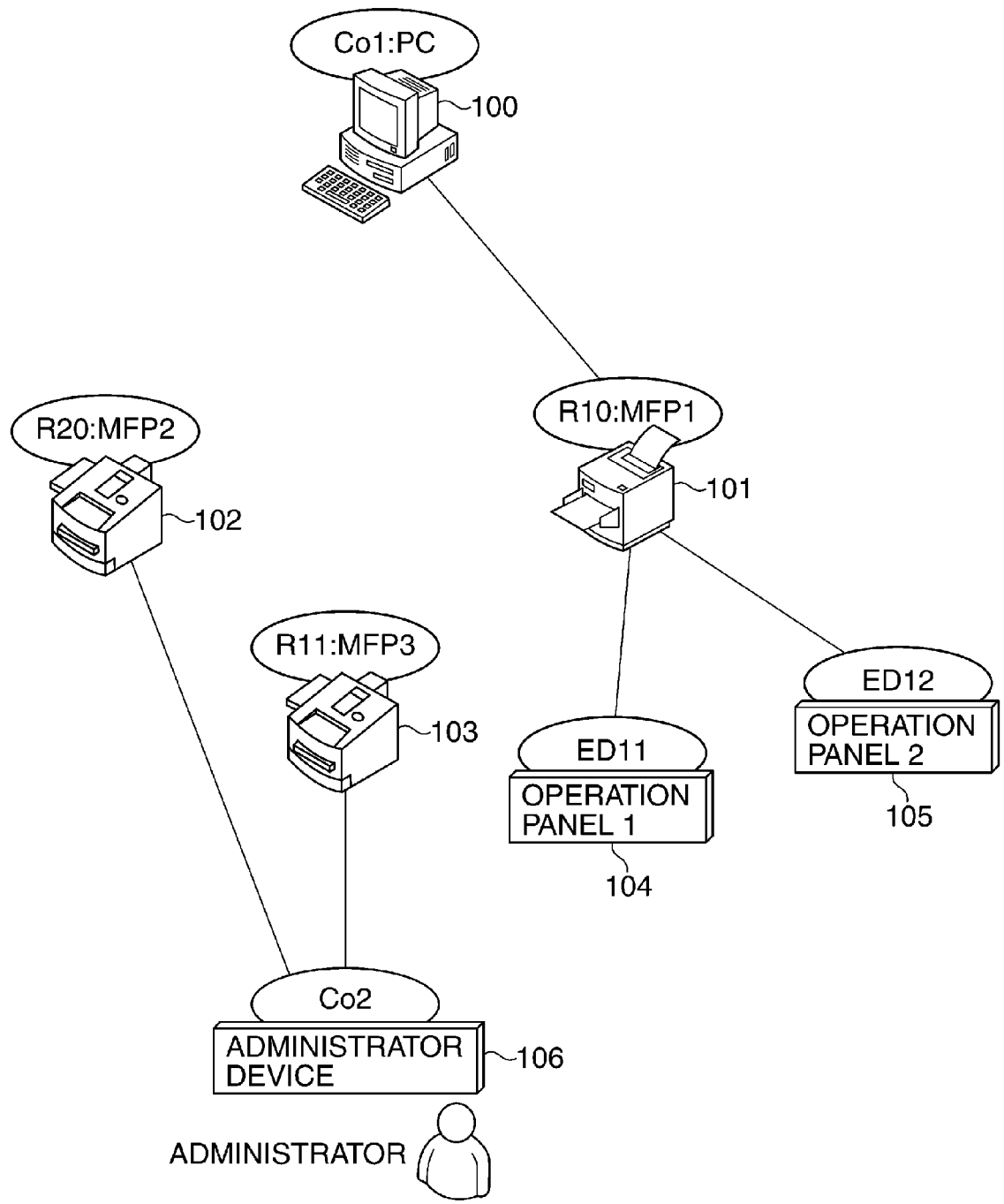
FIG. 2 is a view showing an exemplary network topology in a case where an administrator device has shifted into a setting change mode.

FIG. 2 is a view showing an exemplary network topology in a case where in the WPAN appearing in FIG. 1, the administrator device 106 has shifted into a setting change mode.

Referring to FIG. 2, upon receiving an instruction to shift into the setting change mode, the administrator device 106 switches to a coordinator (Co2) to reconstruct a star network with the MFP2_102 and the MFP3_103. As a result, setting data is directly transmitted from the administrator device 106 to the MFPs (the MFP2_102 and the MFP3_103). On the other hand, the other devices such as the MFP1_101 continue to be connected to the same WPAN as during normal operation.

Figure 3:
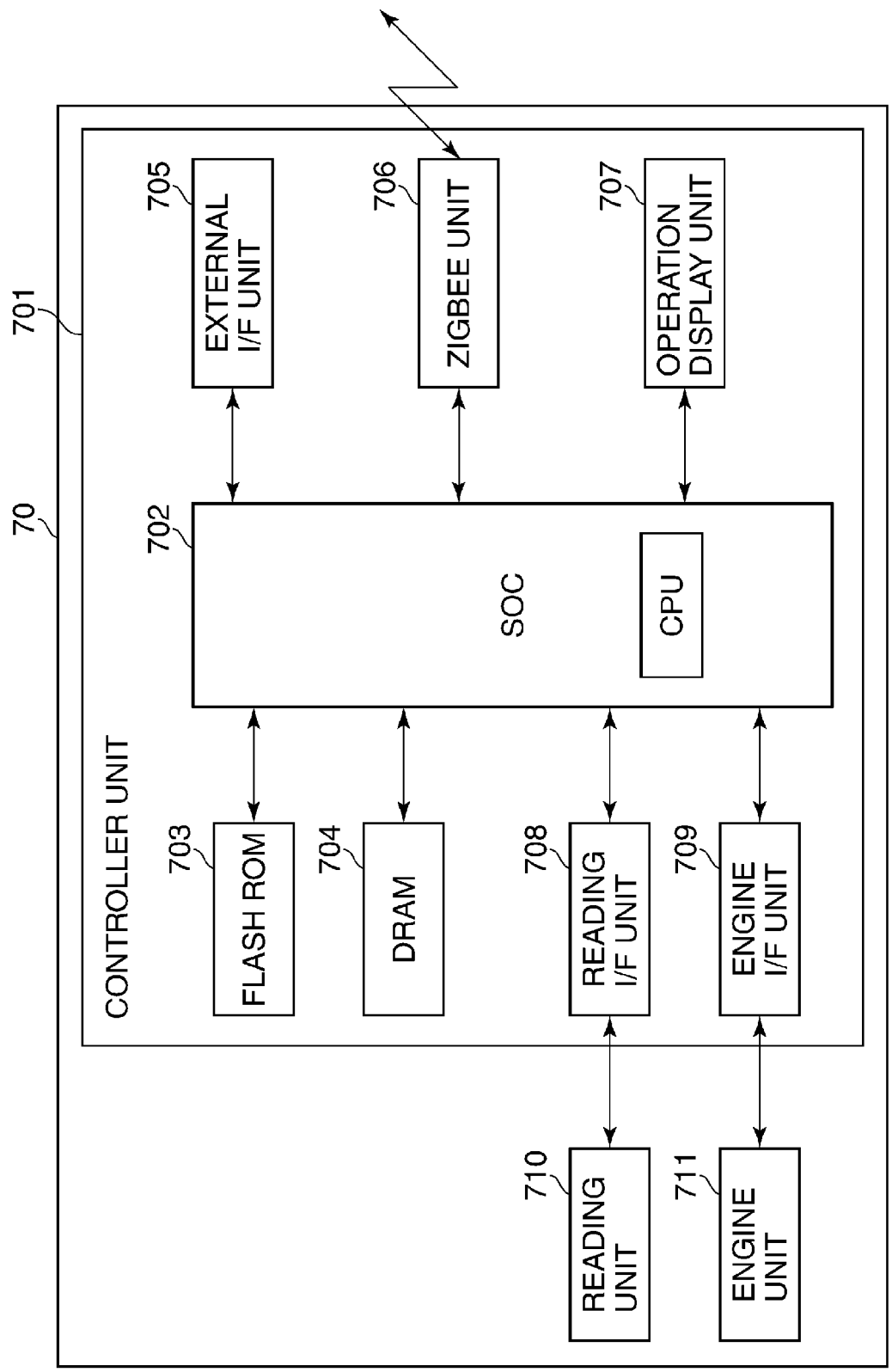
FIG. 3 is a block diagram schematically showing a hardware arrangement of an MFP appearing in FIG. 1.

FIG. 3 is a block diagram schematically showing a hardware arrangement of each device appearing in FIG. 1. It should be noted that an administrator device also has the same arrangement as the one shown in the figure, and description thereof is, therefore, omitted.

A device 70 has a controller unit 701. The controller unit 701 is equipped with an SOC 702 that has a CPU incorporated therein and executes device control programs to control each component. A flash ROM 703 stores compressed programs, unique data, or the like for the device.

A DRAM 704 decompresses compressed programs in the flash ROM 703 and stores them, and temporarily stores image data or the like.

An external I/F 705 unit connects to an external PC or the like and sends and receives data. The external I/F 705 also connects to a PC or the like via a USB cable, a LAN, or the like.

A Zigbee (registered trademark) unit 706 carries out Zigbee (registered trademark) communications with other devices on a WPAN. An operation display unit 707 displays statuses of the device 70 and receives input from a user which relate to device setting values and instructions.

A reading I/F unit 708 connects a reading unit 710 and the SOC 702 together. The SOC 702 controls the reading unit 710 via the reading I/F unit 708, processes image data read by the reading unit 710, and stores the processed image data in the DRAM 704.

An engine I/F unit 709 connects an engine unit 711 and the SOC 702 together. The SOC 702 controls the engine unit 711 via the engine I/F unit 709. The engine unit 711 carries out a printing process based on print data received from the SOC 702 via the engine I/F unit 709.

Next, a description will be given of how MFPs and an administrator device operate when the administrator device has changed into the setting change mode. In the following description of the present embodiment, it is assumed that devices administered by the administrator device 106 are the MFP3_103 and the MFP2_102.

Figure 4:
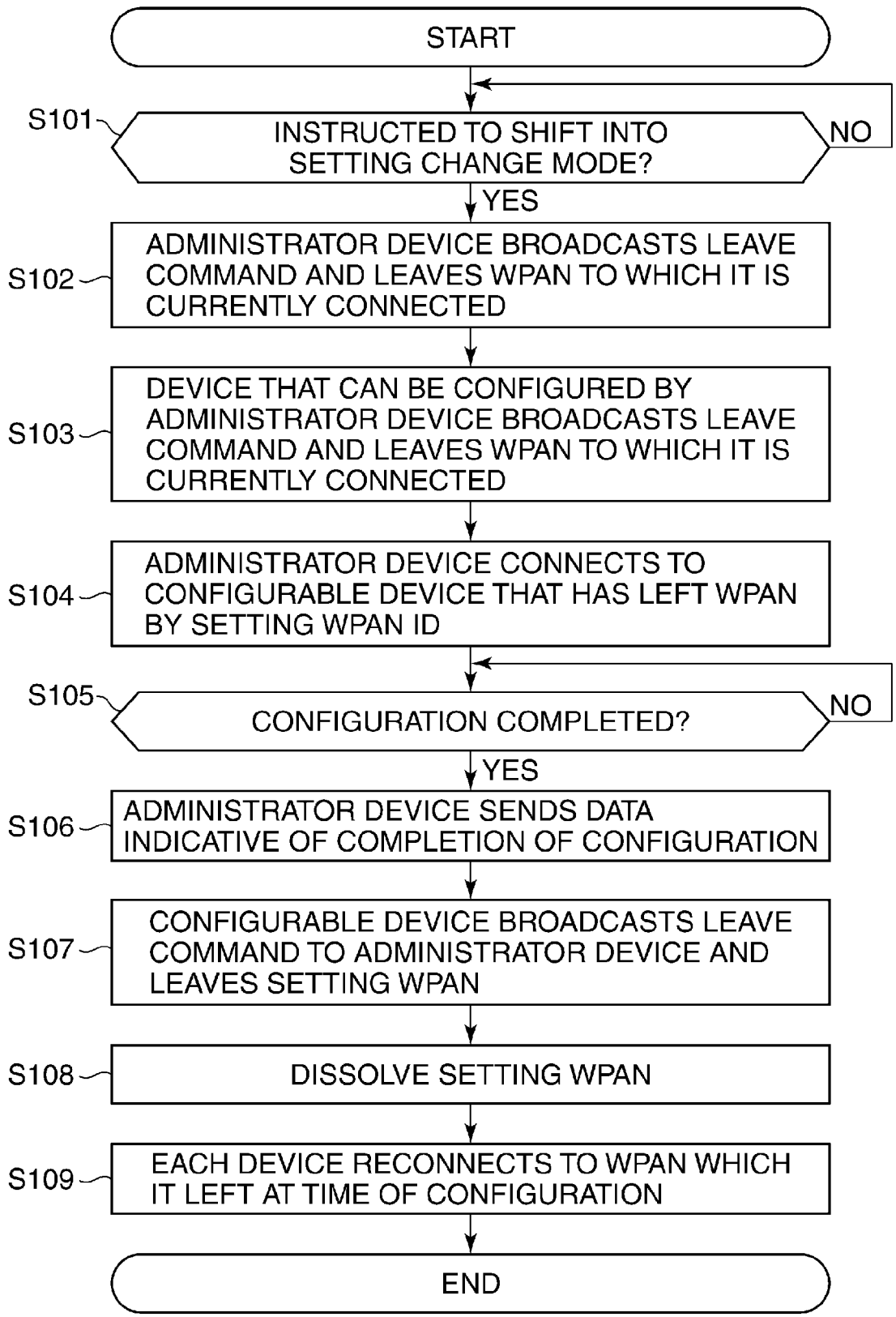
FIG. 4 is a flowchart showing how the MFP and the administrator device operate when the administrator device has shifted into the setting change mode.

FIG. 4 is a flowchart showing how the MFP3_103, the MFP2_102, and the administrator device 106 operate when the administrator device 106 has shifted into the setting change mode.

Referring to FIG. 4, in step S101, the SOC 702 in the administrator device 106 determines whether or not from the operation display unit 707, an administrator has issued an instruction to shift into the mode in which setting values for the MFP3_103 and the MFP2_102 are changed (setting change mode). When there is an instruction to shift into the setting change mode, the process proceeds to step S102.

In the step S102, the SOC 702 in the administrator device 106 controls the Zigbee (registered trademark) unit 706 to broadcast a leave command into a network, and the administrator device 106 leaves a WPAN to which it is currently connected (first wireless communication network). Here, the word "broadcasting" means sending the same data at the same time to all network devices connected to a WPAN. In the step S102, the Zigbee (registered trademark) unit 706 in the administrator device 106 acts as a first leaving unit.

The SOC 702 in each of the MFP3_103 and the MFP2_102 which has received the leave command from the administrator device 106 via the Zigbee (registered trademark) unit 706 recognizes that the administrator device 106 leaves the WPAN to which it is currently connected (first wireless communication network). As a result, the MFP3_103 and the MFP2_102 recognize that the administrator device 106 has shifted into the setting change mode.

Next, in step S103, to receive setting data from the administrator device 106, devices whose settings can be changed from the administrator device 106 leave the WPAN to which they are connected. Namely, the SOC 702 in the MFP3_103 and the MFP2_102 controls the Zigbee (registered trademark) unit 706 to broadcast a leave command to the WPAN to which they are currently connected. As a result, the MFP3_103 and the MFP2_102 leave the WPAN to which they are currently connected. In the step S103, the Zigbee (registered trademark) unit 706 in each of the MFP3_103 and the MFP2_102 acts as a second leaving unit.

In step S104, the SOC 702 in the administrator device 106 uses a setting WPAN ID (setting network ID) and controls the Zigbee (registered trademark) unit 706 to construct a setting WPAN (second wireless communication network).

Figure 5:
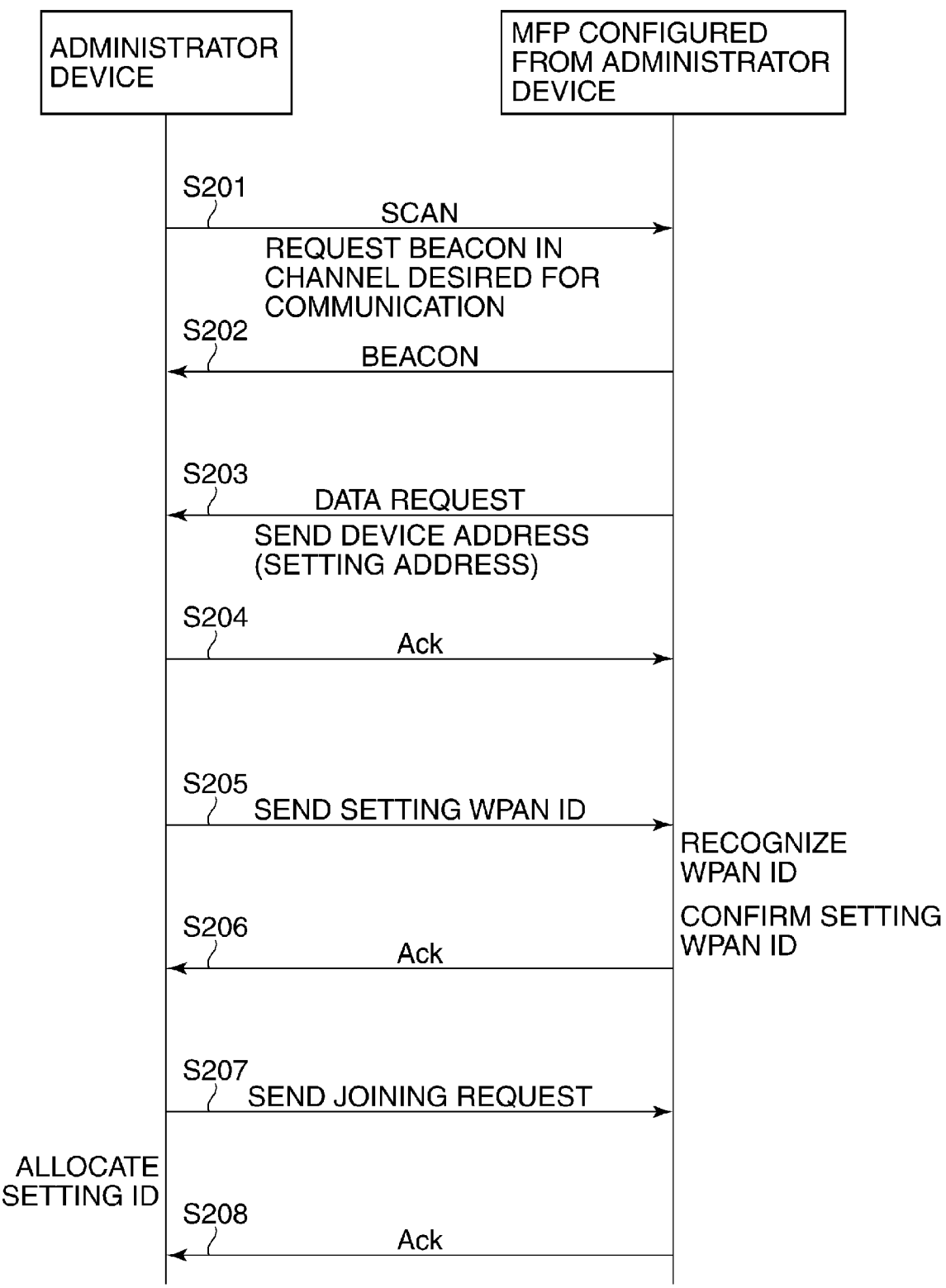
FIG. 5 is a diagram showing how the administrator device and the MFP wirelessly connect to each other.

FIG. 5 shows a flow in which a setting WPAN is constructed between the administrator device 106, which has become the coordinator (Co2) for the setting WPAN, and the MFP2_102 and the MFP3_103. Connecting operations shown in the figure are carried out for each of the connected devices. Thus, in the present embodiment, a description will be given only of wireless connecting operations between the administrator device 106 and the MFP2_102 (the MFP3_103 as well is connected in the same flow).

Referring to FIG. 5, in S201, the SOC 702 in the administrator device 106 controls the Zigbee (registered trademark) unit 706 to request a beacon from the MFP2_102 and wait for a beacon from the MFP2_102.

Then, in S202, the SOC 702 in the MFP2_102 controls the Zigbee (registered trademark) unit 706 to send out a beacon and then, in S203, send an address. In response to this, in S204, the SOC 702 in the administrator device 106 controls the Zigbee (registered trademark) unit 706 to send Ack to the MFP2_102.

Then, in S205, the SOC 702 in the administrator device 106 controls the Zigbee (registered trademark) unit 706 to send the setting WPAN ID. In response to this, the SOC 702 in the MFP2_102 acknowledges that the WPAN ID received via the Zigbee (registered trademark) unit 706 is the setting WPAN ID and sends Ack (S206).

In S207, the SOC 702 in the administrator device 106 controls the Zigbee (registered trademark) unit 706 to send a joining request to the MFP2_102. In response to this, the SOC 702 in the MFP2_102 controls the Zigbee (registered trademark) unit 706 to send Ack (S208), so that the setting WPAN is constructed. In FIG. 5, the Zigbee (registered trademark) unit 706 in the administrator device 106 acts as a first connecting unit, and the Zigbee (registered trademark) unit 706 in the MFP2_102 and the MFP3_103 acts as a second connecting unit.

Figure 6:
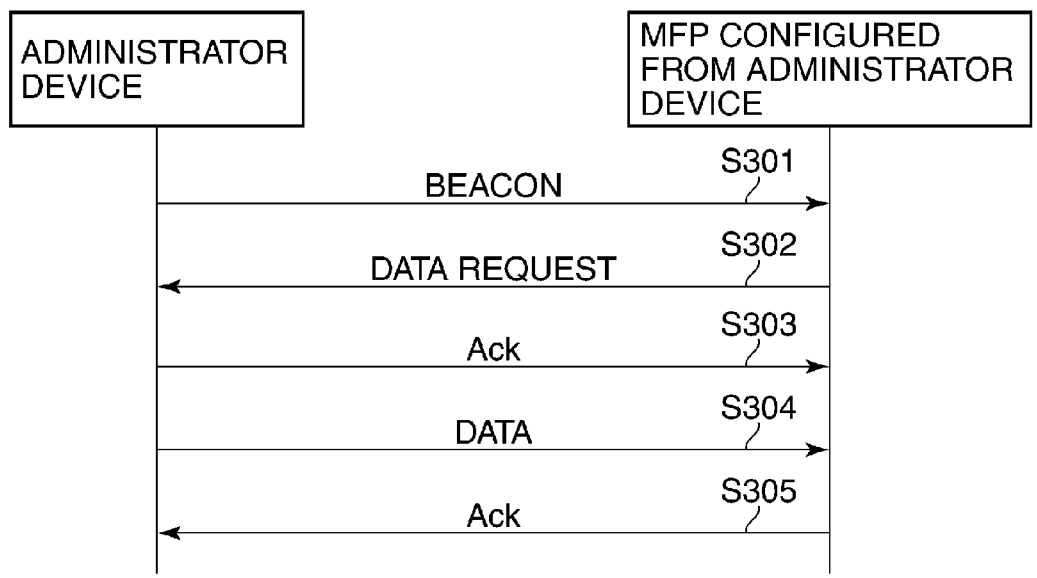
FIG. 6 is a diagram showing how the administrator device and the MFP send data to each other.

When the setting WPAN is constructed, the administrator device 106 sends setting data to the MFP2_102 and the MFP3_103 as shown in FIG. 6 and changes their settings.

Referring to FIG. 6, in S301, the SOC 702 in the administrator device 106 controls the Zigbee (registered trademark) unit 706 to send out a beacon. In response to this, the SOC 702 in the MFP2_102 controls the Zigbee (registered trademark) unit 706 to send a data request to the administrator device 106 (S302).

The SOC 702 in the administrator device 106 controls the Zigbee (registered trademark) unit 706 to send Ack to the MFP2_102 (S303). Then, the SOC 702 in the administrator device 106 controls the Zigbee (registered trademark) unit 706 to send setting data to the MFP2_102 (S304). The SOC 702 in the MFP2_102 which has received the setting data controls the Zigbee (registered trademark) unit 706 to send Ack back to the administrator device 106 (S305). In S304, the SOC 702 in the administrator device 106 acts as a setting data sending unit.

In the above described way, settings on devices are configured by carrying out data communications between an administrator device and each device. It should be noted that examples of data to be set in a setting WPAN include phone book data, count data, communication history data, user setting data, and factory setting data, but the data to be set should not be limited to them.

Referring again to FIG. 4, when the administrator device 106 finishes configuring settings on each device in step S105, the SOC 702 in the administrator device 106 controls the Zigbee (registered trademark) unit 706 to send data indicative of the completion of setting to each device (step S106). In response to this, the SOC 702 in the MFP2_102 controls the Zigbee (registered trademark) unit 706 to broadcast a leave command to the administrator device 106 and leave the setting WPAN (step S107). Likewise, the SOC 702 in the MFP3_103 also controls the Zigbee (registered trademark) unit 706 to leave the setting WPAN. After that, the SOC 702 in the administrator device 106 controls the Zigbee (registered trademark) unit 706 to dissolve the setting WPAN (step S108).

Then, in step S109, the MFP2_102 and the MFP3_103, which have left the setting WPAN, and the administrator device 106, which has become an end device again from a coordinator after the completion of setting, reconnect to the WPAN to which they had been connected before the settings were changed. In the step S109, the Zigbee (registered trademark) unit 706 in the administrator device 106 acts as a first reconnecting unit, and the Zigbee (registered trademark) unit 706 in the MFP2_102 and the MFP3_103 acts as a second reconnecting unit.

Figure 7:
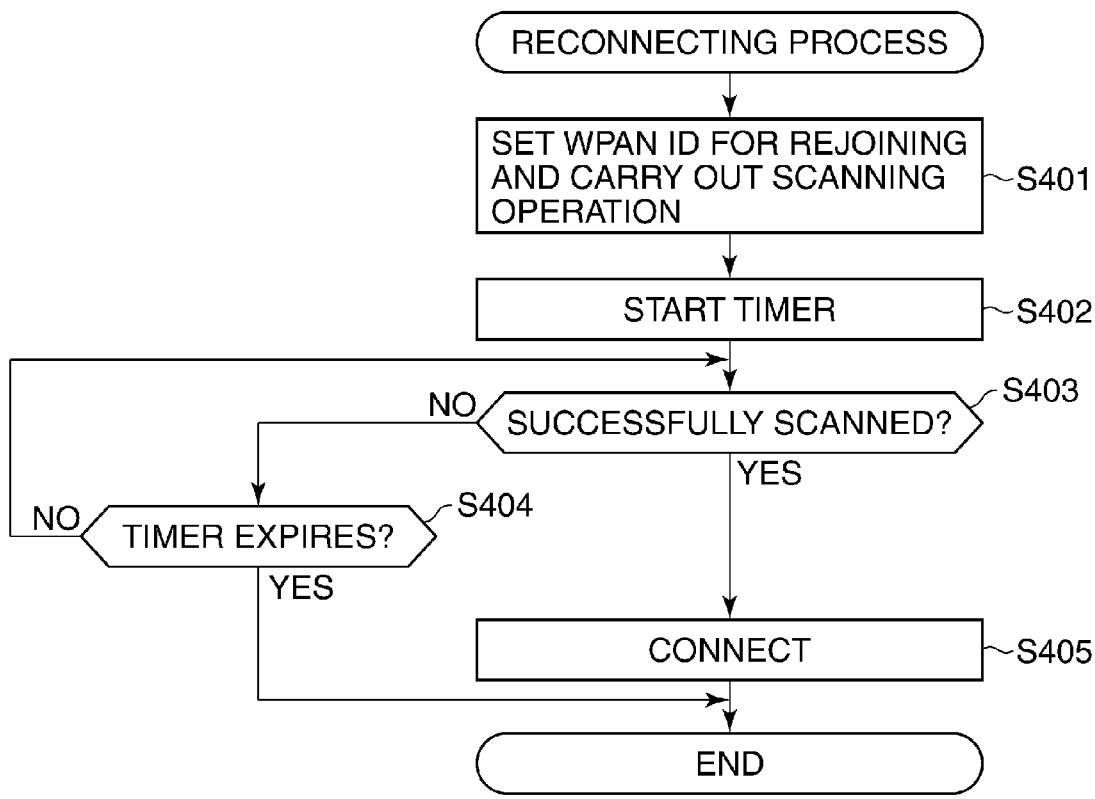
FIG. 7 is a flowchart showing a flow of a reconnecting process in which the administrator device and the MFP reconnect to each other.

Referring to FIG. 7, a description will now be given of how the MFP2_102 and the MFP3_103 and the administrator device 106 reconnect to the WPAN. It should be noted that the MFP2_102, the MFP3_103, and the administrator device 106 all carry out the same process, and therefore, a description will now be given of only the MFP2_102 as a representative.

Referring to FIG. 7, in step S401, the SOC 702 in the MFP2_102 controls the Zigbee (registered trademark) unit 706 to carry out the scanning operation shown in FIG. 5 using a WPAN ID with which the MFP2_102 had been connected to the WPAN before the settings were changed. At the same time, in step S402, the SOC 702 in the MFP2_102 starts a timer.

In step S403, it is determined whether or not the scanning operation shown in FIG. 5 has successfully been carried out, and when the scanning operation has successfully been carried out, the SOC 702 in the MFP2_102 controls the Zigbee (registered trademark) unit 706 to connect the WPAN to which the MFP2_102 was connected before (step S405). On the other hand, when the scanning operation has not successfully been carried out (NO in the step S403), and the timer has expired (YES in step S404), the SOC 702 in the MFP2_102 terminates the process without connecting to the WPAN to which the MFP2_102 was connected before.

It should be noted that the administrator device 106 should not necessarily be a device, but may be a PC that is capable of carrying out Zigbee (registered trademark) communications and in which software for controlling settings on an MFP is installed.

According to the present embodiment, at the time of changing settings on an MFP, the administrator device 106 leaves a wireless communication network to which it is currently connected (FIG. 1). After that, the MFP2_102 and the MFP3_103 leaves a wireless communication network to which they are currently connected, and a setting WPAN is constructed between them and the administrator device 106 (FIG. 2). Further, setting data is communicated between the administrator device and the MFPs to change settings on the MFPs. Because communication is thus controlled such that the administrator device and the devices administered by the administrator device construct a setting wireless communication network, the use of resources in devices can be minimized, and information such as settings on devices can be safely communicated.

A description will now be given of another embodiment of the present invention.

In the embodiment described above, when settings on the MFP2_102 and the MFP3_103 which are administered by the administrator device (Co2) 106 are to be changed, connections are established between the devices through the operations shown in FIG. 5.

When settings are configured by establishing a one-on-one connection between the administrator device 106 and the MFP3_103, the SOC 702 in the administrator device 106 does not send Ack in S204 in response to a connection request in S203 in FIG. 5. As a result, the MFP2_102 cannot connect to a setting WPAN constructed by the administrator device 106. Thus, after a predetermined time period has elapsed, the SOC 702 in the MFP2_102 controls the Zigbee (registered trademark) unit 706 to reconnect, by the same process as the one shown in FIG. 7, to a WPAN to which the MFP2_102 was connected before leaving.

Figure 8:
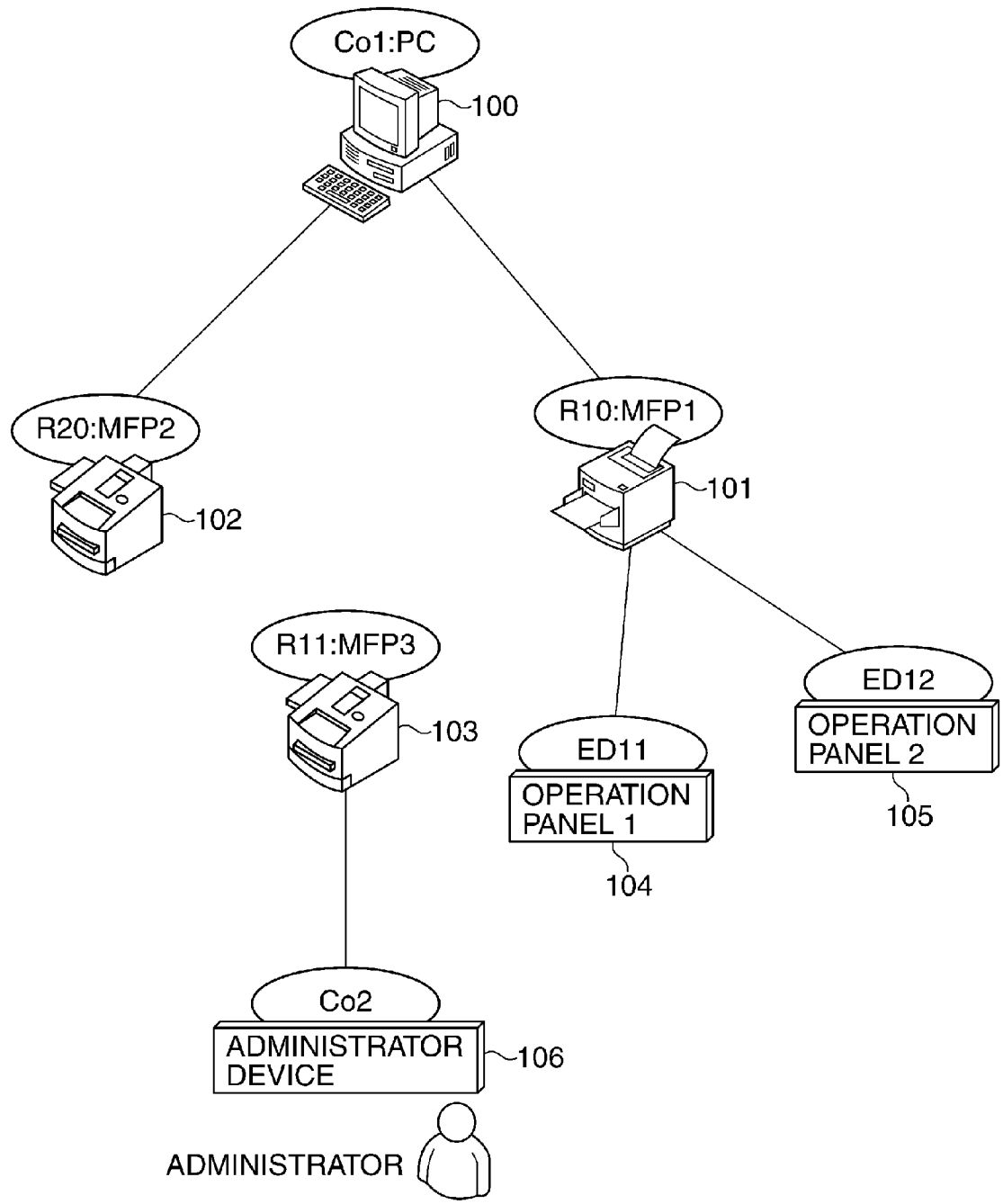
FIG. 8 is a view showing an exemplary network topology according to another embodiment.

On the other hand, the MFP3_103 connects to the SOC 702 in the administrator device 106 through the operations shown in FIG. 5, and establishes a one-on-one connection with the administrator device 106. This state is shown in FIG. 8.

Moreover, because the administrator device 106 uses a setting network ID at the time of changing settings on an MFP, connecting operations for constructing a setting WPAN can be simplified. It should be noted that the setting network ID is stored in the flash ROM 703 or the like.

Further, when settings of an MFP are to be changed, the administrator device 106 becomes a coordinator, and the MFP administered by the administrator device 106 becomes an end device. Thus, the administrator device 106 can construct a star WPAN with an MFP which the administrator device 106 can administer. As a result, an administrator device and an MFP administered by the administrator device establish a one-on-one connection, enabling communication security to be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-285962 filed Dec. 27, 2011, which is hereby incorporated by reference herein in its entirety.

What is claimed is:

1. A device that is capable of communicating with another device via a wireless communication network and administers the other device, comprising:
    a first holding unit configured to hold a setting network ID in a setting change mode for changing setting values of the other device, wherein the setting network ID is a wireless network ID;
    a first leaving unit for leaving a first wireless communication network to which the device is currently connected, in response to the device receiving an instruction to shift into the setting change mode;
    a first connecting unit configured to wirelessly connect to the other device so as to construct, with the other device that leaves the first wireless communication network in response to the device leaving the first wireless communication network, a second wireless communication network, which is different from the first wireless communication network, by using the setting network ID held by said first holding unit; and
    a setting data sending unit configured to send setting data to the other device, to which the device was wirelessly connected by said first connecting unit, via the second wireless communication network.

2. A device according to claim 1, further comprising a first reconnecting unit configured to, after a changing of settings using the setting data sent by said setting data sending unit is completed, reconnect to the first wireless communication network to which the device had been connected before the settings were changed.

3. A device according to claim 1, wherein during normal operation, the other device is set as a coordinator or a router, and the device is set as a router or an end device, and
in the setting change mode, the other device is set as a router or an end device, and the device is set as a coordinator.

4. A device according to claim 1, wherein the setting data includes at least one of phone book data, count data, communication history data, user setting data and factory setting data.

5. A device that is capable of connecting to an administrator device via a wireless communication network, comprising:
a second holding unit configured to hold a setting network ID in a setting change mode for changing setting values of the device, wherein the setting network ID is a wireless network ID;
a second leaving unit for, in response to the administrator device leaving from a first wireless communication network, leaving the first wireless communication network to which the device is currently connected, wherein the administrator device leaves the first wireless communication network in response to the administrator device receiving an instruction to shift into the setting change mode;
a second connecting unit configured to wirelessly connect to the administrator device, which left the first wireless communication network, via a second wireless communication network constructed by the administrator device with the device, which is different from the first wireless communication network, by using the setting network ID held by said second holding unit; and
a setting changing code configured to change settings using setting data received from the administrator device via the second wireless communication network.

6. A device according to claim 5, further comprising a second reconnecting unit configured to, after a changing of settings by said setting changing unit is completed, reconnect to the first wireless communication network to which the device had been connected before the settings were changed.

7. A device according to claim 5, wherein during normal operation, the device is set as a coordinator or a router, and the administrator device is set as a router or an end device, and
in the setting change mode, the device is set as a router or an end device, and the administrator device is set as a coordinator.

8. A device according to claim 5, wherein the setting data includes at least one of phone book data, count data, communication history data, user setting data and factory setting data.

9. A communication control method for a device that is capable of communicating with another device via a wireless communication network and administers the other device, comprising:
a first leaving step of leaving a first wireless communication network to which the device is currently connected, in response to the device receiving an instruction to shift into a setting change mode, wherein the setting change mode is for changing setting values of the other device;
a first connecting step of wirelessly connecting to the other device so as to construct, with the other device that leaves the first wireless communication network in response to the device leaving the first wireless communication network, a second wireless communication network, which is different from the first wireless communication network, by using a setting network ID for use in the setting change mode, wherein the setting network ID is a wireless network ID; and
a setting data sending step of sending setting data to the other device, to which the device was wirelessly connected in said first connecting step, via the second wireless communication network.

10. A communication control method for a device that is capable of connecting to an administrator device via a wireless communication network, comprising:
a second leaving step of for, in response to the administrator device leaving from a first wireless communication network, leaving the first wireless communication network to which the device is currently connected, wherein the administrator device leaving the first wireless communication network occurs in response to the administrator device receiving an instruction to shift into a setting change mode, wherein the setting change mode is for changing setting values of the device;
a second connecting step of wirelessly connecting to the administrator device, which left the first wireless communication network, via a second wireless communication network constructed by the administrator device with the device, which is different from the first wireless communication network, by using a setting network ID for use in the setting change mode, wherein the setting network ID is a wireless network ID; and
a setting changing step of changing settings using setting data received from the administrator device via the second wireless communication network.

11. A non-transitory computer-readable storage medium storing a program for implementing a communication control method for a device that is capable of communicating with another device via a wireless communication network and administers the other device, the communication control method comprising:
a first leaving step of leaving a first wireless communication network to which the device is currently connected, in response to the device receiving an instruction to shift into a setting change mode, wherein the setting change mode is for changing setting values of the other device;
a first connecting step of wirelessly connecting to the other device so as to construct, with the other device that leaves the first wireless communication network in response to the device leaving the first wireless communication network, a second wireless communication network, which is different from the first wireless communication network, by using a setting network ID for use in the setting change mode, wherein the setting network ID is a wireless network ID; and
a setting data sending step of sending setting data to the other device, to which the device was wirelessly connected in the first connecting step, via the second wireless communication network.

12. A non-transitory computer-readable storage medium storing a program for implementing a communication control method for a device that is capable of connecting to an administrator device via a wireless communication network, the communication control method comprising:
a second leaving step of for, in response to the administrator device leaving from a first wireless communication network, leaving the first wireless communication network to which the device is currently connected, wherein the administrator device leaving the first wireless communication network occurs in response to the administrator device receiving an instruction to shift into a setting change mode, wherein the setting change mode is for changing setting values of the device;
a second connecting step of wirelessly connecting to the administrator device, which left the first wireless communication network, via a second wireless communication network constructed by the administrator device with the device, which is different from the first wireless communication network, by using a setting network ID for use in the setting change mode, wherein the setting network ID is a wireless network ID; and
a setting changing step of changing settings using setting data received from the administrator device via the second wireless communication network.

* * * * *